(12) United States Patent
King et al.

(10) Patent No.: US 11,581,794 B2
(45) Date of Patent: Feb. 14, 2023

(54) APPARATUS FOR MONITORING AND/OR CONTROLLING MECHANICAL EQUIPMENT

(71) Applicant: IRDETO B.V., Hoofddorp (NL)

(72) Inventors: Lawrence John King, Ottawa (CA); Pat Ford, Ottawa (CA); Bevan Watkiss, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 302 days.

(21) Appl. No.: 16/868,949

(22) Filed: May 7, 2020

(65) Prior Publication Data

US 2021/0351681 A1    Nov. 11, 2021

(51) Int. Cl.
*H02K 35/02* (2006.01)
*F16F 15/02* (2006.01)
(Continued)

(52) U.S. Cl.
CPC .............. *H02K 35/02* (2013.01); *F16F 15/02* (2013.01); *G05D 19/02* (2013.01);
(Continued)

(58) Field of Classification Search
CPC ..... H02K 35/02; H02K 11/0094; F16F 15/02; G05D 19/02; G06Q 30/0645; H02J 7/32
(Continued)

(56) References Cited

U.S. PATENT DOCUMENTS

| | | | |
|---|---|---|---|
| 7,161,254 B1 | 1/2007 | Janky et al. | |
| 9,369,182 B2 * | 6/2016 | Kurs | H01Q 7/005 |
| 2010/0101537 A1 * | 4/2010 | Allen | F02D 41/32 |
| | | | 123/492 |

FOREIGN PATENT DOCUMENTS

| | | |
|---|---|---|
| CN | 100524870 C | 8/2009 |
| CN | 101399484 B * | 6/2010 |

(Continued)

OTHER PUBLICATIONS

Ruellan et al., "Electromagnetic Resonant Generator," IEEE IAS annual meeting, Hong Kong, CDROM proc., Oct. 2, 2005, pp. 1-8.

(Continued)

*Primary Examiner* — Mahmoud Gimie
(74) *Attorney, Agent, or Firm* — Rimon PC; Marc S. Kaufman

(57) ABSTRACT

There is described a system comprising mechanical equipment and an apparatus for monitoring and/or controlling the mechanical equipment. The mechanical equipment vibrates at a frequency $f_{vibration}$ in use, and the apparatus is attached to the mechanical equipment such that the apparatus also vibrates when the mechanical equipment is in use. The apparatus comprises an electronics module and a resonant electric generator. The resonant electric generator has a resonant frequency $f_0$ comparable to the vibrational frequency $f_{vibration}$ of the mechanical equipment. The resonant electric generator comprises a magnet having an associated a magnetic field, a coil electrically coupled to the electronics module, and a resilient member. The resilient member is configured, when the apparatus is vibrated at or around the resonant frequency $f_0$, to cause relative oscillation of the coil and the magnet so as to induce an electric current in the coil to thereby power the electronics module.

The present application also relates to the apparatus for monitoring and/or controlling the mechanical equipment, and to a method of use of the apparatus with mechanical equipment.

20 Claims, 2 Drawing Sheets

(51) Int. Cl.
   *G05D 19/02*       (2006.01)
   *G06Q 30/06*       (2012.01)
   *G06Q 30/0645*     (2023.01)
   *H02K 11/00*       (2016.01)
   *H02J 7/32*        (2006.01)

(52) U.S. Cl.
   CPC ............ *G06Q 30/0645* (2013.01); *H02J 7/32* (2013.01); *H02K 11/0094* (2013.01)

(58) Field of Classification Search
   USPC ........................................................ 361/147
   See application file for complete search history.

(56)               References Cited

FOREIGN PATENT DOCUMENTS

JP         2000197373 A   *   7/2000
WO     WO-2016097896 A1 *   6/2016   ........... A01D 34/008

OTHER PUBLICATIONS

PCT/EP2021/059183 International Search Report and Written Opinion dated Jul. 5, 2021.

* cited by examiner

APPARATUS FOR MONITORING AND/OR CONTROLLING MECHANICAL EQUIPMENT

FIELD OF THE INVENTION

The present invention relates to monitoring and/or controlling mechanical equipment. In particular, the present invention relates to apparatus for monitoring and/or controlling mechanical equipment that vibrates in use, such as a plate compactor.

BACKGROUND OF THE INVENTION

Smaller pieces of mechanical equipment (e.g. mechanical compactors, diesel powered hand tools, and small construction equipment) are often rented to customers, and used on job sites. It would be useful for rental companies to be able to track and monitor such equipment. For example, it would be useful to track how many hours the customer has used the equipment, and possibly shut down the equipment if the contract terms are exceeded. Knowing the location of the rented equipment would allow the rental companies to pick up the equipment when the rental term is complete. Additionally, such equipment is easily misplaced on a large construction site, or even stolen, so tracking of the equipment location would aid in speedy recovery of the equipment.

Tracking and communication technology is often used to monitor and control remote systems through mobile phone applications, or over the internet. However, such technology generally requires an electrical power source, and many pieces of mechanical equipment do not have an onboard electrical power source that could be used to power such technology. For example, small diesel engines with pull start have no electronics on board, and have no electrical components of any kind in the system, so power is not available for add-on tracking and communication technology. An example of this type of equipment is a DPS 1850H plate compactor from WackerNeuson (see https://www.wackerneuson.de/en/products/compaction/vibratory-plates/single-direction-vibratory-plates/model/dps-range-18-kn/).

The present invention seeks to provide a powered apparatus suitable for tracking and control of this type of mechanical equipment.

SUMMARY OF THE INVENTION

In order to power an electronic apparatus for monitoring and/or control of mechanical equipment with no onboard electrical power source, it is necessary to retro-fit an electrical power source to the mechanical equipment. Whilst electrical power could be provided for a limited period of time by a battery, this is not an ideal solution as batteries eventually run out of charge. Once a battery has run out of charge, the apparatus would have no way to report that the battery needs replacement, and no way to track or control operation of the mechanical equipment. Another potential way to provide electrical power is a standard generator which generates power from the rotating crank on the engine of the mechanical equipment. However, a difficulty with this option is the mechanical connection of the generator to the crank, through the use of gears or a belt and pulleys. Such a rotary generator is very difficult to retrofit in the field and would add considerable labour costs and high component costs for a robust solution. In contrast, the present application uses vibrational motion associated with the mechanical equipment to power the apparatus.

A lot of mechanical equipment tends to vibrate in use. For example, diesel-powered mechanical equipment vibrates in use. The present application is thus particularly relevant to diesel-powered mechanical equipment, but it will be understood that the described methodology and devices may equally be used with other types of vibrating mechanical equipment/engines. The vibrational frequency of diesel engines tends to be in the range 30-200 Hz. This vibrational energy (i.e. mechanical motion) may be harnessed to power an apparatus for monitoring and/or controlling the mechanical equipment. Thus, the apparatus includes a resonant electric generator to harness the vibrational energy of the mechanical equipment. The resonant electric generator is then used to power an electronics module which monitors and/or controls the mechanical equipment. The apparatus may be used to control aspects of the mechanical equipment if additional control mechanisms are in place. The apparatus may be retrofitted to mechanical equipment which has no electrical power supply on board (e.g. pull-start or rope start or rewind start or recoil start) diesel-powered mechanical equipment with no electric starter). Of course the apparatus may also be fitted to mechanical equipment which does have an electrical power supply on board, but it is particularly advantageous in cases where there is no other electrical power supply available.

To solve these problems, subject matter is described in connection with the following clauses.

Clause A1: An apparatus comprising: an electronics module; and a resonant electric generator having a resonant frequency $f_0$, the resonant frequency $f_0$ being comparable to a vibrational frequency $f_{vibration}$ of diesel-powered mechanical equipment, the resonant electric generator comprising: a magnet having an associated a magnetic field; a coil electrically coupled to the electronics module; and a resilient member configured, when the apparatus is vibrated at or around the resonant frequency $f_0$, to cause relative oscillation of the coil and the magnet so as to induce an electric current in the coil to thereby power the electronics module.

Clause A2: The apparatus of clause A1 wherein $f_0$ is in the range 30-200 Hz.

Clause A3: The apparatus of clause A1 or A2 wherein the resonant electric generator has a Q factor in the range 5-15.

Clause A4: The apparatus of any of clauses A1-A3 wherein the resilient member is coupled to the coil such that vibration of the apparatus causes relative oscillation of the coil.

Clause A5: The apparatus of any of clauses A1-A3 wherein the resilient member is coupled to the magnet such that vibration of the apparatus causes relative oscillation of the magnet.

Clause A6: The apparatus of any of any of clauses A1-A5 wherein the electronics module comprises a location monitoring module configured to collect location data.

Clause A7: The apparatus of any of clauses A1-A6 wherein the electronics module comprises a vibration monitoring module configured to collect vibrational data.

Clause A8: The apparatus of clause A7 wherein the vibrational data includes data relating to times during which the apparatus is vibrating.

Clause A9: The apparatus of any of clauses A1-A8 wherein the electronics module comprises a wireless transmitter configured to transmit at least some of the collected data to a remote location.

Clause A10: The apparatus of any of clauses A1-A9 wherein the electronics module comprises a storage module configured to store electrical power from the resonant electric generator.

Clause A11: The apparatus of clause A10 wherein the storage module is a capacitor or rechargeable battery.

Clause A12: The apparatus of clause A10 or A11 wherein the magnet is an electromagnet powered by electrical power stored in the storage module.

Clause A13: The apparatus of any of clauses A1-A12 wherein the magnet is a permanent magnet.

Clause B1: A system comprising: mechanical equipment that vibrates at a frequency $f_{vibration}$ in use; apparatus attached to the mechanical equipment such that the apparatus also vibrates when the mechanical equipment is in use, the apparatus comprising: an electronics module; and a resonant electric generator having a resonant frequency $f_0$, the resonant frequency $f_0$ being comparable to the vibrational frequency $f_{vibration}$ of the mechanical equipment, the resonant electric generator comprising: a magnet having an associated a magnetic field; a coil electrically coupled to the electronics module; and a resilient member configured, when the apparatus is vibrated at or around the resonant frequency $f_0$, to cause relative oscillation of the coil and the magnet so as to induce an electric current in the coil to thereby power the electronics module.

Clause B2: The system of clause B1 further comprising: a fuel supply for the mechanical equipment; and an actuator configured to control a supply of fuel from the fuel supply to the mechanical equipment; wherein the electronics module is configured to control the actuator by means of an electronic actuator control signal.

Clause B3: The system of clause B2 wherein the electronic actuator control signal is based on one or more of: a control signal received from a remote location by means of a wireless receiver of the electronics module; and a control schedule stored in a memory of the electronics module.

Clause B4: The system of clause B3 or B4 wherein the electronics module is configured to control the actuator to restrict the supply of fuel based on the received control signal.

Clause B5: The system of any of clauses B1-B4 wherein the mechanical equipment is powered by a diesel engine.

Clause C1: A method comprising: attaching an apparatus to mechanical equipment that vibrates at a frequency $f_{vibration}$ in use, wherein the apparatus is attached to the mechanical equipment such that the apparatus also vibrates when the mechanical equipment is in use, the apparatus comprising: an electronics module; and a resonant electric generator having a resonant frequency $f_0$, the resonant frequency $f_0$ being comparable to the vibrational frequency $f_{vibration}$ of the mechanical equipment, the resonant electric generator comprising: a magnet having an associated a magnetic field; a coil electrically coupled to the electronics module; and a resilient member; using the mechanical equipment such that the mechanical equipment and the attached apparatus both vibrate at the vibrational frequency $f_{vibration}$, thereby causing relative oscillation of the coil and the magnet so as to induce an electric current in the coil; and powering the electronics module with the induced electric current.

Clause C2: The method of clause C1 further comprising: using the electronics module to collect data relating to the mechanical equipment.

Clause C3: The method of clause C1 or C2 further comprising: providing an actuator to control a supply of fuel from a fuel supply to the mechanical equipment; and the electronics module controlling the actuator by means of an electronic actuator control signal.

Clause C4: The method of clause C3 wherein controlling the actuator comprises restricting the supply of fuel based on the received control signal.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

There is described a system comprising mechanical equipment and an apparatus for monitoring and/or controlling the mechanical equipment. The mechanical equipment vibrates at a frequency $f_{vibration}$ in use. The apparatus is attached to the mechanical equipment such that the apparatus also vibrates when the mechanical equipment is in use. The apparatus comprises an electronics module and a resonant electric generator. The resonant electric generator has a resonant frequency $f_0$ comparable to the vibrational frequency $f_{vibration}$ of the mechanical equipment. The resonant electric generator comprises a magnet having an associated a magnetic field, a coil electrically coupled to the electronics module, and a resilient member. The resilient member is configured, when the apparatus is vibrated at or around the resonant frequency $f_0$, to cause relative oscillation of the coil and the magnet so as to induce an electric current in the coil to thereby power the electronics module.

Figure 1:
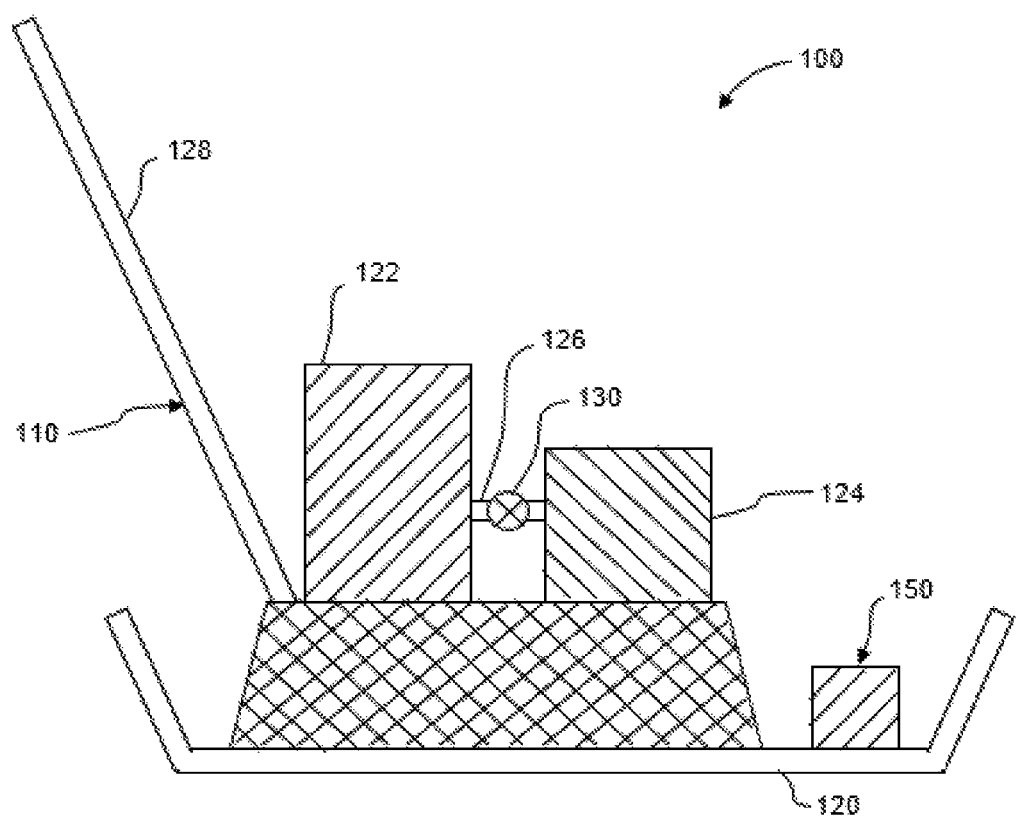
FIG. 1 schematically illustrates an example of mechanical equipment comprising an apparatus for monitoring and/or controlling the mechanical equipment.

An example of such a system 100 is schematically illustrated in FIG. 1. The exemplary system 100 comprises mechanical equipment in the form of a plate compactor 110, and an apparatus 150 for monitoring the plate compactor 110.

As shown in FIG. 1, the exemplary plate compactor 110 comprises a compacting plate 120, an engine 122, a fuel supply 124 connected to the engine 122 by means of a fuel supply line 126, and a handle 128. An optional actuator 130 is also shown for controlling the supply of fuel from the fuel supply 124 to the engine 122.

The plate compactor 110 vibrates at a frequency $f_{vibration}$ in use. For example, the range of DPS 1850H plate compactors available from WackerNeuson vibrate at a frequency of 90 Hz or 98 Hz in use. This is the vibrational frequency of the compacting plate 120, which need not be the same as the vibrational frequency of the engine 122 itself. For example, each DPS 1850H plate compactor available from WackerNeuson uses a 3,600 rpm air-cooled single-cylinder diesel engine, so the vibrational frequency of the engine is 60 Hz. The differences in these vibrational frequencies are due to a gearing system between the engine and the compacting plate.

The apparatus 150 is attached to the plate compactor 110 such that the apparatus 150 also vibrates when the plate compactor 110 is in use. In the example of FIG. 1, the apparatus 150 is attached to a top side of the compacting plate 120. Thus, when the plate compactor 110 is in use, both the compacting plate 120 and the apparatus 150 vibrate together at the vibrational frequency of the compacting plate 120. Advantageously, the apparatus is permanently attached to the mechanical equipment.

It will be understood that the arrangement shown in FIG. 1 is merely exemplary. The mechanical equipment need not be a plate compactor 110. Any mechanical equipment which includes a vibrating portion in use could be monitored using the apparatus 150. For example, the apparatus 150 could be attached to any diesel engine which vibrates in use. However, in the context of the plate compactor 110, attaching the apparatus 150 to the compacting plate 120 is preferable to attaching it to the engine 122. This is because the vibrational amplitude of the compacting plate 120 will be larger than the vibrational amplitude of the engine 122, so more power can be generated (see the excitation amplitude $Z_m$ in equation (3) below).

Figure 2:
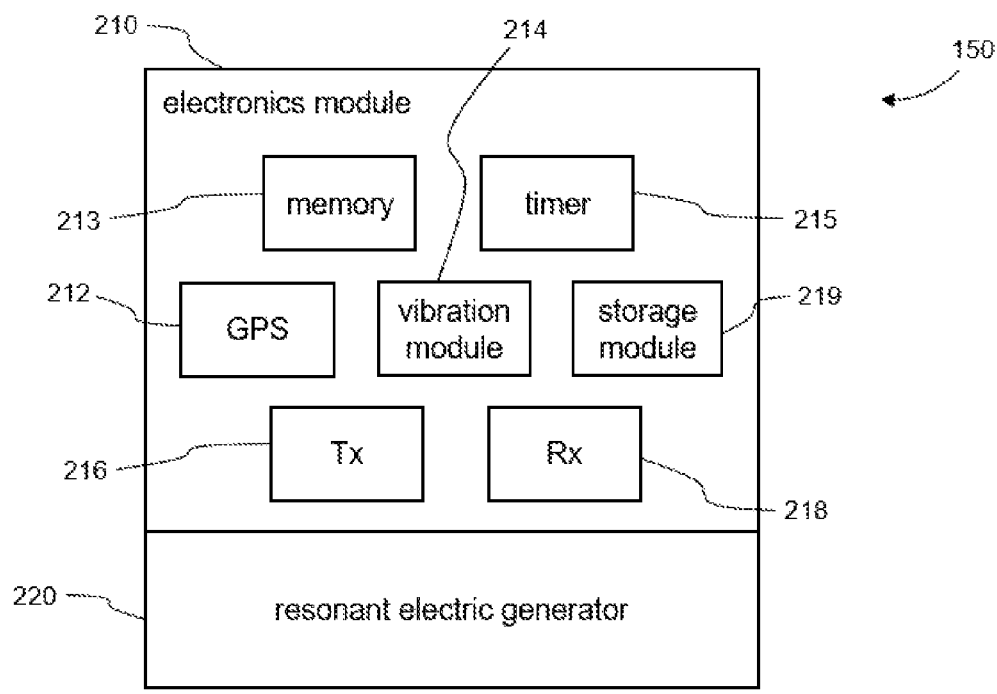
FIG. 2 schematically illustrates an example of the apparatus for monitoring and/or controlling the mechanical equipment.

As schematically illustrated in FIG. 2, the apparatus 150 itself comprises an electronics module 210 and a resonant electric generator 220.

The electronics module 210 may be configured to collect/obtain data relating to the mechanical equipment to which it is attached (e.g. the plate compactor 110). The collected data may be data relating to the apparatus 150 itself, and this data may be used as a proxy for data relating to the mechanical equipment since the apparatus 150 is attached to the mechanical equipment so will have a similar location and movement/vibration profile.

As shown in FIG. 2, the electronics module 210 may include one or more of a GPS module 212, a vibration monitoring module 214, a wireless transmitter 216, a wireless receiver 218, a storage module 219, a memory 213, and a timer 215. The GPS module 212 is configured to collect/obtain location data relating to the apparatus 150, which can be used as a proxy for location data relating to the mechanical equipment to which the apparatus 150 is attached (e.g. the plate compactor 110). It will be understood that the GPS module 212 is merely exemplary, and any location monitoring module could be used to collect/obtain location data relating to the apparatus 150. For example, the location monitoring module could obtain location data from nearby cell towers (e.g. via radio waves). Alternatively, the location monitoring module could detect sunlight to determine location based in part on sunrise and sunset times. The vibration monitoring module 214 is configured to collect/obtain vibrational data relating to the apparatus 150, which can be used as a proxy for location data relating to the mechanical equipment to which the apparatus 150 is attached (e.g. the plate compactor 110). The vibrational data may include data relating to times during which the apparatus 150 is vibrating. Such data is a proxy for times during which the plate compactor 110 is in use. The data may include any/all of start times of use, end times of use, duration of use, etc. The storage module 219 is configured to store electrical power from the resonant electric generator 220. The storage module 219 may be a capacitor or a rechargeable battery, for example. The storage module 219 is operable to be charged by the resonant electric generator when the associated mechanical equipment is in use (i.e. vibrating), and then the stored energy in the storage module 219 may be used to provide power to the electronics module 210 when the mechanical equipment is not in use (i.e. not vibrating).

The wireless transmitter 216 is configured to transmit at least some of the collected data to a remote location/server. The collected data may be stored in the memory 213 for potential transmission via the wireless transmitter 216 at a later time. Alternatively, the collected data may be transmitted straight away via the wireless transmitter 216 such that no data storage is required. The wireless receiver 218 is configured to receive incoming signals from a remote location/server. The transmitter 216 and receiver 218 need not be completely separate; they may be combined into a wireless transceiver, as is known in the art. Any type of wireless communication is envisaged, such as Bluetooth, cellular communications (e.g. LTE, 3G, 4G, low bandwidth 5G once available), or even Wifi in some instances. The required power to run the electronics module is only tens or hundreds of mW. Bluetooth communications are preferred due to the lower power drawn. In this case, the communications between the apparatus 150 and the remote location would go via a user's mobile phone (or other personal computing device) as an intermediary. In particular, communication between the apparatus 150 and the user's mobile phone would be via Bluetooth, and communications between the user's mobile phone and the remote location would be cellular communications, as is known in the art. Due to the higher power requirements compared to Bluetooth, cellular communications between the apparatus 150 and the user's mobile phone and/or remote location could be used as a back-up if Bluetooth communications failed, or if the mechanical equipment and/or apparatus 150 were lost/stolen. In summary, any suitable wireless communication system is possible depending on the circumstances, as would be well understood by a person skilled in the art. In addition, it will be understood that instead of (or in addition to) the wireless transmitter 216, the apparatus 150 could include a port for wired connection to a mobile phone (or other computing device) to enable wired transmission of collected data when desired.

The resonant electric generator 220 has a resonant frequency $f_0$ that is comparable to the vibrational frequency $f_{vibration}$ of the plate compactor 110. The frequencies being 'comparable' does not mean that the frequencies $f_0$ and $f_{vibration}$ must be exactly equal (although this is advantageous in order to obtain maximum power from the resonant electric generator 220). In practice, the vibrational frequency of the engine 122 will vary by perhaps 10% in use, so it is desirable that the resonant electric generator 220 is able to provide sufficient power even with a 10% mismatch in frequencies. It is further desirable that an additional frequency mismatch (up to perhaps 20% in total) should also be within tolerances. The resonant frequency issue is discussed in more detail below.

The resonant electric generator 220 is based on a resonant spring and magnet along with an energy pickup coil. In particular, the resonant electric generator 220 comprises one or more magnets having an associated magnetic field, one or more coils electrically coupled to the electronics module, and one or more resilient members. The one or more resilient members are configured, when the apparatus 150 is vibrated at or around the resonant frequency $f_0$, to cause relative oscillation of the one or more coils and the one or more magnets so as to induce an electric current in the one or more coils to thereby power the electronics module 210. An example is schematically illustrated in FIG. 3, where the resonant electric generator 220 comprises a single tubular permanent magnet 310, a single coil 320 disposed coaxially within the magnet 310, and two resilient members in the form of springs 330a, 330b.

Figure 3:
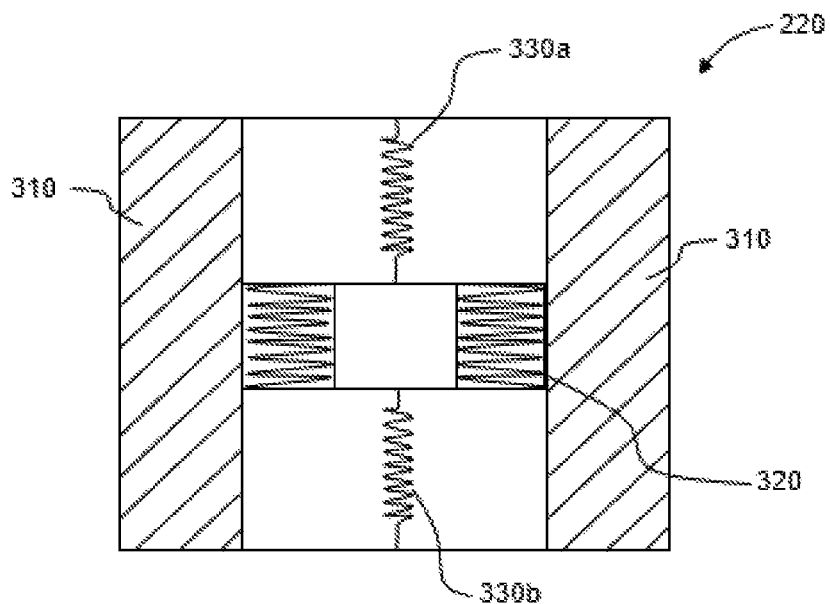
FIG. 3 schematically illustrates an example of a resonant electric generator which forms part of the apparatus of FIG. 2.

In the example of FIG. 3, the magnet 310 is in a fixed position within the resonant electric generator 220 (and within the apparatus 150). Similarly, one end of each spring 330 has a fixed position within the resonant electric generator 220 (and within the apparatus 150). The coil 320 is coupled between the other (non-fixed) ends of each spring 330. Thus, the springs 330 are coupled to the coil 320 such that the coil 320 oscillates within the resonant electric generator 220 (and within the apparatus 150) when the apparatus 150 is vibrated by mechanical equipment to which it is attached. Importantly, the coil 320 is able to move relative to the magnet 310 so as to induce an electric current in the coil 320. Since the coil 320 is electrically coupled to the electronics module 210, this electric current can be used to power the electronics module 210. In the example of FIG. 3, the coil 320 is able to oscillate axially up and down (as shown by the two arrows) within the tubular magnet 310. In this example, the resilient members (i.e. the springs 330) are coupled to the coil 320 such that vibration of the apparatus 150 causes relative oscillation of the coil 320. As will be understood, the resonant electric generator 220 should be mounted in an orientation to enable oscillation of the coil 320 based on the vibrations of the mechanical equipment. In other words, the arrows shown in FIG. 3 should aim to be parallel with vibrational vectors of the mechanical equipment. In other words, the direction of oscillation of the coil 320 should be aligned as far as possible with the vibrational motion of the mechanical equipment.

Mechanical resonance of the resonant electric generator 220 is obtained when $$f_{vibration} = f_0 = \frac{1}{2\pi}\sqrt{\frac{k}{m}} \quad (1)$$

where k is the spring constant, and m is the mobile mass of the system (i.e. made up of the mass of the coil 320 and the mass of the springs 330 in the example of FIG. 3). As mentioned above, the vibrational frequency $f_{vibration}$ of diesel engines tends to be in the range 30-200 Hz. This range also encompasses the vibrational frequency $f_{vibration}$ of the compacting plate 120 of a plate compactor 110 (e.g. 90-100 Hz). Thus, the resonant electric generator 220 is designed such that $f_0$ is in the range 30-200 Hz. Hence, a suitable spring constant k and mobile mass m should be chosen to provide a resonant frequency $f_0$ in this range. Thus, when designing an apparatus 150 suitable for use with a particular piece of mechanical equipment having a vibrational frequency $f_{vibration}$ of 30 Hz, a different spring constant k and mobile mass m will be chosen as compared to for another piece of mechanical equipment having a vibrational frequency $f_{vibration}$ of 200 Hz. This is well within the remit of the skilled person. For example, an audio speaker without a cone may be used as a starting point for the resonant electric generator 220.

It will be understood that the range 30-200 Hz for $f_0$ is exemplary. In another example, the resonant electric generator 220 is designed such that $f_0$ is in the range 60-200 Hz. In another example, the resonant electric generator 220 is designed such that $f_0$ is in the range 60-150 Hz. In another example, the resonant electric generator 220 is designed such that $f_0$ is in the range 60-100 Hz.

Another consideration when designing the resonant electric generator 220 for a particular piece of mechanical equipment is the Q factor, defined by:

$$Q = \frac{f_0}{\Delta f} \quad (2)$$

where $\Delta f$ is the resonance width or full width at half maximum (FWHM), i.e. the bandwidth over which the power of vibration is greater than half the power at the resonant frequency. In other words, a higher Q factor is associated with a narrower band of resonance, and a lower Q factor associated with wider band of resonance. The higher the Q factor, the more energy it is possible to obtain from the system, but the trade-off is bandwidth. As discussed previously, it is desirable that the resonant electric generator is designed with some tolerance for a mismatch between $f_{vibration}$ and $f_0$ so that it is possible to generate power using mechanical equipment running at off-centre frequencies. In other words, a lower Q factor is desirable in this application. As an example, consider a centre vibrational frequency of 90 Hz with an inherent variability such that the vibrational frequency is 85-95 Hz in practice. In this case, the Q factor is 90/10=9. Thus a Q factor of around 10 may be envisaged. If further bandwidth is required, a lower Q factor of around 5 may be suitable. If more power is required, a higher Q factor of around 15 may be acceptable. Thus, a Q factor range of 5-15 is envisaged to be suitable for the present application.

At mechanical resonance, the power provided by the resonant electric generator 220 is given by:

$$P_0 = 4\pi^3 m\, Z_m f_0^3 L_{max} \quad (3)$$

where $Z_m$ is the excitation amplitude (i.e. the amplitude of the vibrations provided by the mechanical equipment), and $L_{max}$ is the stroke (i.e. the amplitude of displacement of the mobile mass between its equilibrium position and the upper and lower limits). $P_0$ is thus the maximum power obtainable from the resonant electric generator 220.

As mentioned above, the power P required to power the electronics module 210 might be in the range 10-1000 mW, and the desired resonant frequency $f_0$ is in the range 30-200 Hz. Furthermore, the excitation amplitude $Z_m$ for a particular piece of mechanical equipment will be known, so the resonant electric generator 220 should be designed to have suitable m and $L_{max}$ to achieve these goals. Again, this is well within the remit of a skilled person given practical constraints (e.g. in terms of the size of the apparatus 150, which will put limits on $L_{max}$).

It will be understood that the arrangement shown in FIG. 3 is merely exemplary. In an alternative arrangement, only a single spring 330b is required, or additional springs 330 may be used. Similarly, the coil 320 may be formed from multiple coils. Alternatively multiple separate coils 320 may be used. The magnet 310 may in fact be a magnet arrangement formed from multiple magnets. Equally, the magnet 310 may instead be a cylindrical magnet disposed coaxially within the coil 320. It will be understood that the use of a permanent magnet 310 is desirable in most cases because a permanent magnet does not draw power. Nonetheless, the magnet could be an electromagnet in some scenarios. In particular, the storage module 219 could be used to power an electromagnet. This alternative electromagnet example is advantageous in that it is lower weight, and the magnetic field strength can be controlled. Notably, controlling the magnetic field strength allows the power output to be controlled.

In a further alternative arrangement, the coil 320 may be in a fixed position within the resonant electric generator 220 (and within the apparatus 150) and the magnet 310 may be coupled to the spring(s) 330 such that the magnet 310 oscillates within the resonant electric generator 220 (and within the apparatus 150) when the apparatus 150 is vibrated by mechanical equipment to which it is attached. In this alternative, the resilient member(s) 330 are coupled to the magnet(s) 310 such that vibration of the apparatus 150 causes relative oscillation of the magnet 310. However, it is more advantageous to couple the spring(s) 330 to the coil 320 (e.g. as shown in FIG. 3) since the coil 320 is lighter than the magnet 310. In particular, the range of 30-200 Hz is quite high to obtain resonance and requires relatively stiff resilient member(s). Thus, based on equation (1), it is desirable to reduce the mobile mass m as much as possible. Hence, the preference for moving the coil(s) 320 using the springs 330, rather than moving the magnet(s) 310 using the spring(s) 330.

Turning back to FIG. 1, the actuator 130 is configured to control a supply of fuel from the fuel supply 126 to the mechanical equipment (i.e. the plate compactor 110). In particular, the actuator 130 controls a supply of fuel from the fuel supply 126 to the diesel engine 122. The electronics module 210 is configured to control the actuator 130 by means of an electronic actuator control signal. Thus, the actuator 130 is electrically-controlled. For example, it may be an electrically-controlled valve or servo motor configured to open/close the fuel supply line 126. It is possible to retrofit such an actuator 130 to mechanical equipment. Alternatively, if a mechanical actuator already exists to control the supply of fuel, it is possible to modify the pre-existing mechanical actuator to accept electronic actuator control signals. As shown in FIG. 1, the actuator 130 may be remote from the apparatus 150. Nonetheless, the actuator 130 is communicatively coupled to the apparatus 150. For example, the actuator 130 may comprise a wireless receiver to receive wireless electronic actuator control signals from the wireless transmitter 216 of the electronics module 210 of the apparatus 150.

The electronic actuator control signal may be based on a control signal received from a remote location by means of the wireless receiver 218 of the electronics module 210. In this case, the electronics module 210 is configured to control the actuator 130 based on the received control signal. For example, based on the received control signal, the electronics module 210 may be configured to control the actuator 130 to restrict the supply of fuel along the fuel supply line 126 between the fuel supply 124 and the engine 122. In a diesel engine, the actuator 130 may configured to turn on/off the fuel supply, or to reduce/increase engine compression. In a gasoline engine, the actuator may be configured to kill the spark required to start the engine. Thus, the apparatus 150 may be used to control the mechanical equipment remotely. For example, the apparatus 150 may be used to remotely switch off the mechanical equipment if a user has already exceeded their rental term.

Alternatively/additionally, the electronic actuator control signal may be based on a control schedule stored in the memory 213 of the electronics module 210. In particular, with reference to the timer 215, the electronics module 210 may transmit electronic actuator control signals to the actuator 130 based on times indicated in the control schedule. The control schedule may be pre-programmed, and/or may be updated based on update signals received from a remote location by the wireless receiver 218.

In use, a method starts by (a) attaching the apparatus 150 (as described above) to mechanical equipment that vibrates at a frequency $f_{vibration}$ in use. The apparatus 150 should be attached to the mechanical equipment such that the apparatus 150 also vibrates when the mechanical equipment is in use. The method further comprises (b) using the mechanical equipment such that the mechanical equipment and the attached 150 apparatus both vibrate at the vibrational frequency $f_{vibration}$, thereby causing relative oscillation of the coil 320 and the magnet 310 so as to induce an electric current in the coil 320, and (c) powering the electronics module 210 with the induced electric current.

The method may further comprise using the electronics module 210 to collect data relating to the mechanical equipment. Such data collection may be as described previously.

The method may further comprise providing an actuator 130 (as described above) to control a supply of fuel from the fuel supply 124 to the mechanical equipment, and the electronics module 220 controlling the actuator 130 by means of an electronic actuator control signal (as described above). Controlling the actuator 130 may comprise restricting the supply of fuel based on the received control signal.

The invention claimed is:

1. An apparatus comprising:
an electronics module, wherein the electronics module comprises a vibration monitoring module configured to collect vibrational data; and
a resonant electric generator having a resonant frequency $f_0$, the resonant frequency $f_0$ being comparable to a vibrational frequency $f_{vibration}$ of diesel-powered mechanical equipment, the resonant electric generator comprising:
a magnet having an associated a magnetic field;
a coil electrically coupled to the electronics module; and
a resilient member configured, when the apparatus is vibrated at or around the resonant frequency $f_0$, to cause relative oscillation of the coil and the magnet so as to induce an electric current in the coil to thereby power the electronics module.

2. The apparatus of claim 1 wherein $f_0$ is in the range 30-200 Hz.

3. The apparatus of claim 1 wherein the resonant electric generator has a Q factor in the range 5-15.

4. The apparatus of claim 1 wherein the resilient member is coupled to the coil such that vibration of the apparatus causes relative oscillation of the coil.

5. The apparatus of claim 1 wherein the resilient member is coupled to the permanent magnet such that vibration of the apparatus causes relative oscillation of the permanent magnet.

6. The apparatus of claim 1 wherein the electronics module comprises a location monitoring module configured to collect location data.

7. The apparatus of claim 1 wherein the vibrational data includes data relating to times during which the apparatus is vibrating.

8. The apparatus of claim 1 wherein the electronics module comprises a wireless transmitter configured to transmit at least some of the collected data to a remote location.

9. The apparatus of claim 1, wherein the electronics module comprises a storage module configured to store electrical power from the resonant electric generator.

10. The apparatus of claim 9 wherein the storage module is a capacitor or rechargeable battery.

11. The apparatus of claim 9 wherein the magnet is an electromagnet powered by electrical power stored in the storage module.

12. The apparatus of claim 1 wherein the magnet is a permanent magnet.

13. A system comprising:
mechanical equipment that vibrates at a frequency $f_{vibration}$ in use;
an apparatus attached to the mechanical equipment such that the apparatus also vibrates when the mechanical equipment is in use, the apparatus comprising:
an electronics module; and
a resonant electric generator having a resonant frequency $f_0$, the resonant frequency $f_0$ being comparable to the vibrational frequency $f_{vibration}$ of the mechanical equipment, the resonant electric generator comprising:
a magnet having an associated a magnetic field;
a coil electrically coupled to the electronics module; and
a resilient member configured, when the apparatus is vibrated at or around the resonant frequency $f_0$, to cause relative oscillation of the coil and the magnet so as to induce an electric current in the coil to thereby power the electronics module;
wherein the electronics module comprises a vibration monitoring module configured to collect vibrational data.

14. The system of claim 13 further comprising:
a fuel supply for the mechanical equipment; and
an actuator configured to control a supply of fuel from the fuel supply to the mechanical equipment;
wherein the electronics module is configured to control the actuator by means of an electronic actuator control signal.

15. The system of claim 14 wherein the electronic actuator control signal is based on one or more of:
a control signal received from a remote location by means of a wireless receiver of the electronics module; and
a control schedule stored in a memory of the electronics module.

16. The system of claim 14 wherein the electronics module is configured to control the actuator to restrict the supply of fuel based on the received control signal.

17. The system of claim 13 wherein the mechanical equipment is powered by a diesel engine.

18. A method comprising:
attaching an apparatus to mechanical equipment that vibrates at a frequency $f_{vibration}$ in use, wherein the apparatus is attached to the mechanical equipment such that the apparatus also vibrates when the mechanical equipment is in use, the apparatus comprising:
an electronics module; and
a resonant electric generator having a resonant frequency $f_0$, the resonant frequency $f_0$ being comparable to the vibrational frequency $f_{vibration}$ of the mechanical equipment, the resonant electric generator comprising:
a magnet having an associated a magnetic field;
a coil electrically coupled to the electronics module; and
a resilient member;
using the mechanical equipment such that the mechanical equipment and the attached apparatus both vibrate at the vibrational frequency $f_{vibration}$, thereby causing relative oscillation of the coil and the magnet so as to induce an electric current in the coil; and
powering the electronics module with the induced electric current;
wherein the electronics module comprises a vibration monitoring module configured to collect vibrational data.

19. The method of claim 18, further comprising:
using the electronics module to collect data relating to the mechanical equipment.

20. The method of claim 18 further comprising:
providing an actuator to control a supply of fuel from a fuel supply to the mechanical equipment; and
the electronics module controlling the actuator by means of an electronic actuator control signal.

* * * * *